(No Model.)
F. SWEETLAND.
TIRE FOR CYCLE WHEELS.
No. 489,509. Patented Jan. 10, 1893.
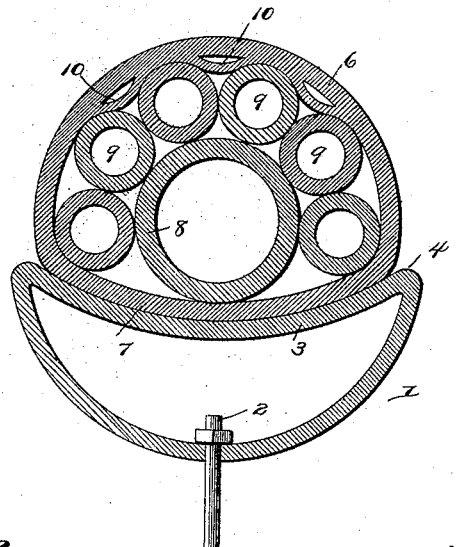
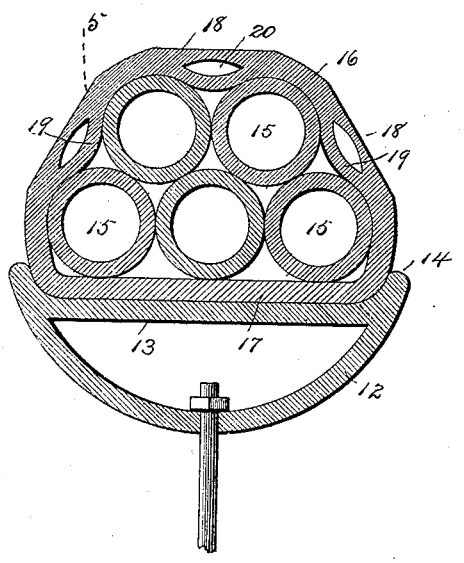 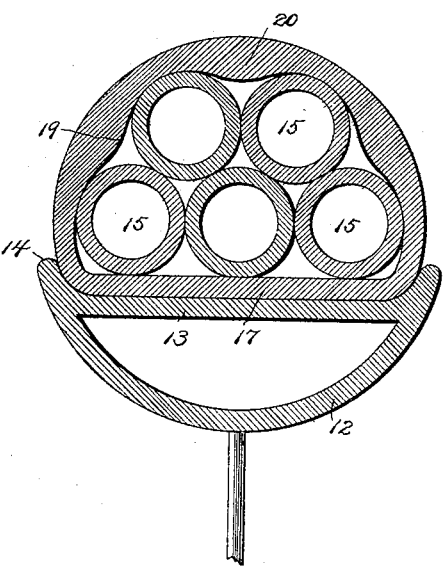
Witnesses
Inventor
Frank Sweetland.
By his Attorneys,

UNITED STATES PATENT OFFICE.

FRANK SWEETLAND, OF ANGOLA, NEW YORK.

TIRE FOR CYCLE-WHEELS.

SPECIFICATION forming part of Letters Patent No. 489,509, dated January 10, 1893.

Application filed April 19, 1892. Serial No. 429,804. (No model.)

*To all whom it may concern:*

Be it known that I, FRANK SWEETLAND, a citizen of the United States, residing at Angola, in the county of Erie and State of New York, have invented a new and useful Tire for Cycle-Wheels, of which the following is a specification.

My invention relates to improvements in tires for wheels, and more particularly for those employed in bicycles and tricycles.

The objects of my invention are to provide a tire which, by its peculiar construction, shall be elastic, durable, and light, and not liable to become misplaced or slip from the rim.

With these and other objects in view, the invention consists in certain features of construction hereinafter specified and particularly pointed out in the claim.

Referring to the drawings—Figure 1 is a transverse section of a wheel having a tire constructed in accordance with my invention and in accordance with my preferred form. Figs. 2 and 3 are similar views of modified constructions.

Like numerals of reference indicate like parts in all the figures of the drawings.

Referring more particularly to Fig. 1, the rim consists of the inner, and in cross-section substantially semi-circular portion 1, into which the ends of the spokes 2, are let, and the outer transverse connecting portion 3 secured to the opposite sides of the inner portion 1, or formed integral therewith and leaving at the edges of the rim the annular flanges 4.

The tire comprises an outer tube 5, which may be formed of rubber in a homogeneous piece, or composite. This tube 5 in cross-section consists of an outer substantially semi-circular portion 6 and an inner flattened portion 7, the latter conforming to the transverse portion 3 of the rim and the entire tire being located between the flanges 4. Such a form of tire is less liable to become misplaced and the rim and tire as a whole may be manufactured much lighter and with greater resisting powers. Resting upon the inner side of the flattened portion 7 of the outer tube 5, is a main tube 8, preferably formed of heavy rubber, though the same may be composite, and surrounding the upper side of this tube is a series of secondary tubes 9, in this instance six in number, but whose number may be increased or diminished. These tubes, like the tube 8, may be homogeneous or composite. It will be seen that the series of tubes 9 extend from the flattened portion 7 at one side of the tube 5 entirely around the main tube 8 to the opposite side of said flattened portion. If desired, the inner side of the tube 5, at the curved portion 6, may be provided with inner circumferential ribs 10, which are substantially semicircular in cross-section, and these will take into the interstices or spaces formed between the outer series of secondary tubes 9, so that not only is the tube 5 strengthened and supported at those points where the tubes 9 do not contact, but the tubes 9 are also prevented from becoming displaced. These ribs 10 may, in order to secure lightness as well as elasticity, be provided with bores 11, or in other words made hollow.

A tire thus constructed will be found to possess great, though not undue, elasticity, will be strong and extremely durable, and it will tenaciously adhere to its seat upon the rim.

In Fig. 2 I have illustrated a modified construction. In this figure 12 designates the inner curved portion of the rim, 13 the transverse portion or seat thereof, and 14 the opposite annular flanges between which the tire is located. In this instance the seat or transverse portion 13 is somewhat more flattened than is the corresponding part 3 illustrated in Fig. 1. In the said Fig. 2 I employ a series of five cushioning-tubes 15, and an outer covering-tube 16. The cushioning-tubes have three of their series about equal in diameter to the width of the rim, and are seated against the inner flattened portion 17 of the outer tube 16. Upon the series of inner tubes the two remaining tubes are mounted, the latter being located opposite the interstices or spaces occurring between the inner tubes. It will be seen that the arrangement is substantially like that in Fig. 1 with the exception that all of the tubes are of the same diameter. The outer tube covering these series of tubes will not only be flattened at its inner side, but will also have a flattened tread as its extreme outer periphery, as indicated at 18. The outer tube 16 is provided at its inner side with the series of three circumferential ribs 19, in this instance bored as at 20 but which may be solid. These ribs perform the same functions in this instance as in Fig. 1, namely, maintain the tubes in position and support the outer tube 16 where the tubes 15 do not contact therewith. The tubes 15 and 16, it will be understood, may be homogeneous or composite.

In Fig. 3 the construction is the same as in Fig. 2, like numerals applying in the two figures, the only difference being that the outer tube 16 has no flattened portion 18 and its ribs are therefore preferably solid.

From the foregoing description, in connection with the accompanying drawings, it will be seen that I have provided a tire possessing great elasticity or cushioning properties, as well as durability and lightness.

Having described my invention, what I claim is—

The herein described cushion tire, the same consisting of the outer or external tube, and a series of inclosed smaller tubes, said external tube being provided upon its inner side with ribs taking between the inner tubes, said ribs being hollow, substantially as specified.

In testimony that I claim the foregoing as my own I have hereto affixed my signature in the presence of two witnesses.

FRANK SWEETLAND.

Witnesses:
E. M. CLARK,
W. D. GRAY.